United States Patent [19]

Takehara et al.

[11] Patent Number: 5,016,911
[45] Date of Patent: May 21, 1991

[54] AUTOMOTIVE SUSPENSION SYSTEM

[75] Inventors: Shin Takehara; Takeshi Edahiro; Toshiki Morita; Hiroyoshi Kumada, all of Hiroshima, Japan

[73] Assignee: Mazda Motor Corporation, Hiroshima, Japan

[21] Appl. No.: 385,144

[22] Filed: Jul. 26, 1989

[30] Foreign Application Priority Data

Jul. 29, 1988 [JP] Japan .................. 63-190102
Sep. 6, 1988 [JP] Japan .................. 63-223317

[51] Int. Cl.$^5$ ............................................. B60G 15/12
[52] U.S. Cl. ........................... 280/708; 188/314; 267/64.15
[58] Field of Search ............... 280/708, 702; 267/64.15, 64.11; 188/314

[56] References Cited

U.S. PATENT DOCUMENTS

| | | | |
|---|---|---|---|
| 1,566,190 | 12/1925 | Finkhaus | 188/314 |
| 3,163,412 | 12/1964 | Troy | 280/708 |
| 3,604,725 | 9/1971 | Goff | 280/708 |
| 3,945,664 | 3/1976 | Hiruma | 280/708 |
| 4,162,091 | 7/1979 | Sano | 280/702 |
| 4,478,431 | 10/1984 | Muller et al. | 280/708 |

FOREIGN PATENT DOCUMENTS

| | | | |
|---|---|---|---|
| 1483928 | 5/1967 | France | 280/708 |
| 59-137206 | 8/1984 | Japan | |
| 60-193708 | 10/1985 | Japan | 280/708 |
| 62-289418 | 12/1987 | Japan | 280/708 |

Primary Examiner—Charles A. Marmor
Assistant Examiner—Karin Tyson
Attorney, Agent, or Firm—Sixbey, Friedman, Leedom & Ferguson

[57] ABSTRACT

A hydropneumatic suspension system for a vehicle has a hydraulic cylinder-piston device connected between the vehicle body and each of the wheels, and a plurality of gas springs which exert a spring force according to the hydraulic pressure in the hydraulic chamber of the cylinder-piston device. Each gas spring has a fluid chamber and a gas chamber which are defined in a casing and are separated from each other by a movable partition wall, and the fluid chamber is communicated with the hydraulic chamber of the hydraulic cylinder-piston device. The upper end portion of the piston rod is supported by the vehicle body by way of a mount. The piston rod is provided with a fluid passage which axially extends through the piston rod and the lower end of which opens to the hydraulic chamber of the cylinder-piston device. A support member is fixed to the piston rod at an upper portion below the mount. The upper end portions of the casings of the gas springs are mounted on the support member and the fluid chamber of each gas spring is communicated with the fluid passage in the piston rod by way of a fluid passage formed in the support member.

12 Claims, 6 Drawing Sheets

FIG. 9

AUTOMOTIVE SUSPENSION SYSTEM

BACKGROUND OF THE INVENTION

1. Field of the Invention

This invention relates to a hydropneumatic automotive suspension system which has a hydraulic cylinder-piston device connected between a vehicle body and a wheel, and a gas spring which exerts a spring force according to the hydraulic pressure in the hydraulic chamber of the cylinder-piston device.

2. Description of the Prior Art

Though the automotive suspension system generally comprises a combination of a mechanical spring and a shock absorber, there also has been known a hydropneumatic suspension system, as disclosed in U.S. Pat. No. 4,162,091, which has a hydraulic cylinder-piston device connected between a vehicle body and a wheel, and a gas spring which exerts a spring force according to the hydraulic pressure in the hydraulic chamber of the cylinder-piston device.

The gas spring comprises a fluid chamber and a gas chamber which are defined in a casing and are separated from each other by a movable partition wall, and the fluid chamber is communicated with the hydraulic chamber of the hydraulic cylinder-piston device. The gas spring must be arranged so that when the hydraulic pressure in the hydraulic chamber changes due to bump or rebound of the wheel, the movable partition wall can be displaced or deformed to a position where the gas spring can exert a spring force according to the hydraulic pressure in the hydraulic chamber. For this purpose, the volume of the casing must be large. However, when the volume of the casing is large, the overall size of the gas spring is increased. Since it is very difficult to allot to the gas spring an integrated large space in the vicinity of the hydraulic cylinder-piston device, the gas spring has been obliged to be complicated in shape, which limits freedom in layout of the suspension system and adds to the manufacturing cost of the gas spring.

SUMMARY OF THE INVENTION

In view of the foregoing observations and description, the primary object of the present invention is to provide a hydropneumatic suspension system which affords an increased freedom in layout of the suspension and can be manufactured at low cost.

In accordance with the present invention, there is provided a hydropneumatic suspension system for a vehicle comprising a hydraulic cylinder-piston device which is connected between the vehicle body and each of the wheels and includes a cylinder which defines a hydraulic chamber together with a piston slidably received therein, a piston rod being connected to the piston and projecting upward from the cylinder, and a plurality of gas springs each of which has a fluid chamber and a gas chamber which are defined in a cylindrical casing and are separated from each other by a movable partition wall, the fluid chamber being communicated with the hydraulic chamber of the hydraulic cylinder-piston device so that each gas spring exerts a spring force according to the hydraulic pressure in the hydraulic chamber of the cylinder-piston device charcterized in that the upper end portion of the piston rod is supported by the vehicle body by way of a mount, the piston rod is provided with a fluid passage which axially extends through the piston rod and the lower end of which opens to the hydraulic chamber of the cylinder-piston device, a support member is fixed to the piston rod at an upper portion below the mount, and the upper end portions of the casings of the gas springs are mounted on the support member, the fluid chamber of each gas spring being communicated with the fluid passage in the piston rod by way of a fluid passage formed in the support member.

DESCRIPTION OF THE PREFERRED EMBODIMENTS

Figure 6:
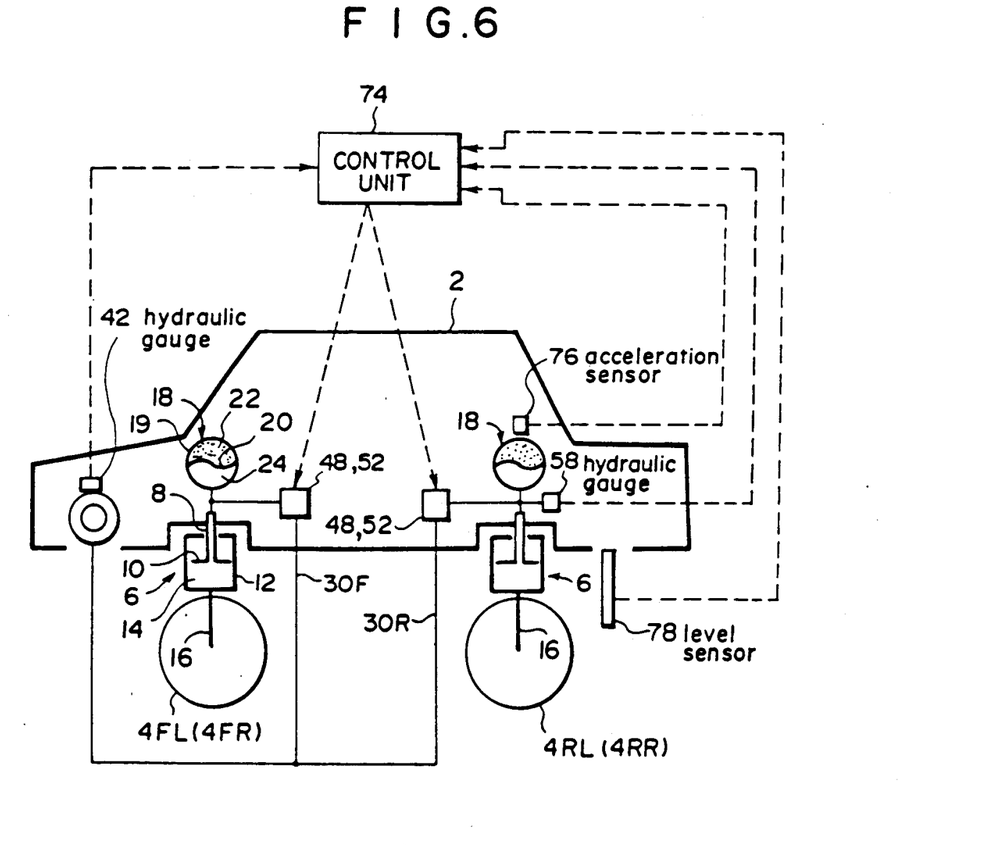
FIG. 6 is a schematic view showing a vehicle provided with the suspension system.

In FIG. 6 which shows a vehicle provided with a suspension system in accordance with an embodiment of the present invention, a hydraulic cylinder piston device 6 is connected between the vehicle body 2 and each of the wheels 4 (the right front wheels 4FR, the left front wheels 4FL, the right rear wheels 4RR and the left rear wheels 4RL). The characteristics of the suspension are changed by feed and discharge of hydraulic fluid to and from the hydraulic cylinder-piston devices 6. Each cylinder-piston device 6 comprises a cylinder 12 in which a hydraulic chamber 14 is defined, a piston 10 which is slidably received in the hydraulic chamber 14, and a piston rod 8 which is formed integrally with the piston rod 10 and projects upward from the cylinder 12. The piston rod 8 is connected to the vehicle body 2 and the cylinder 12 is connected to the wheel 4 by way of a wheel support 16. A gas spring 18 is communicated with the hydraulic chamber 14 by way of a hydraulic passage formed through the piston rod 8. The gas spring 18 comprises a fluid chamber 24 and a gas chamber 22 which are defined in a casing 19 and are separated from each other by a movable partition wall 20, and the fluid chamber 24 is communicated with the hydraulic chamber 14.

Figure 7:
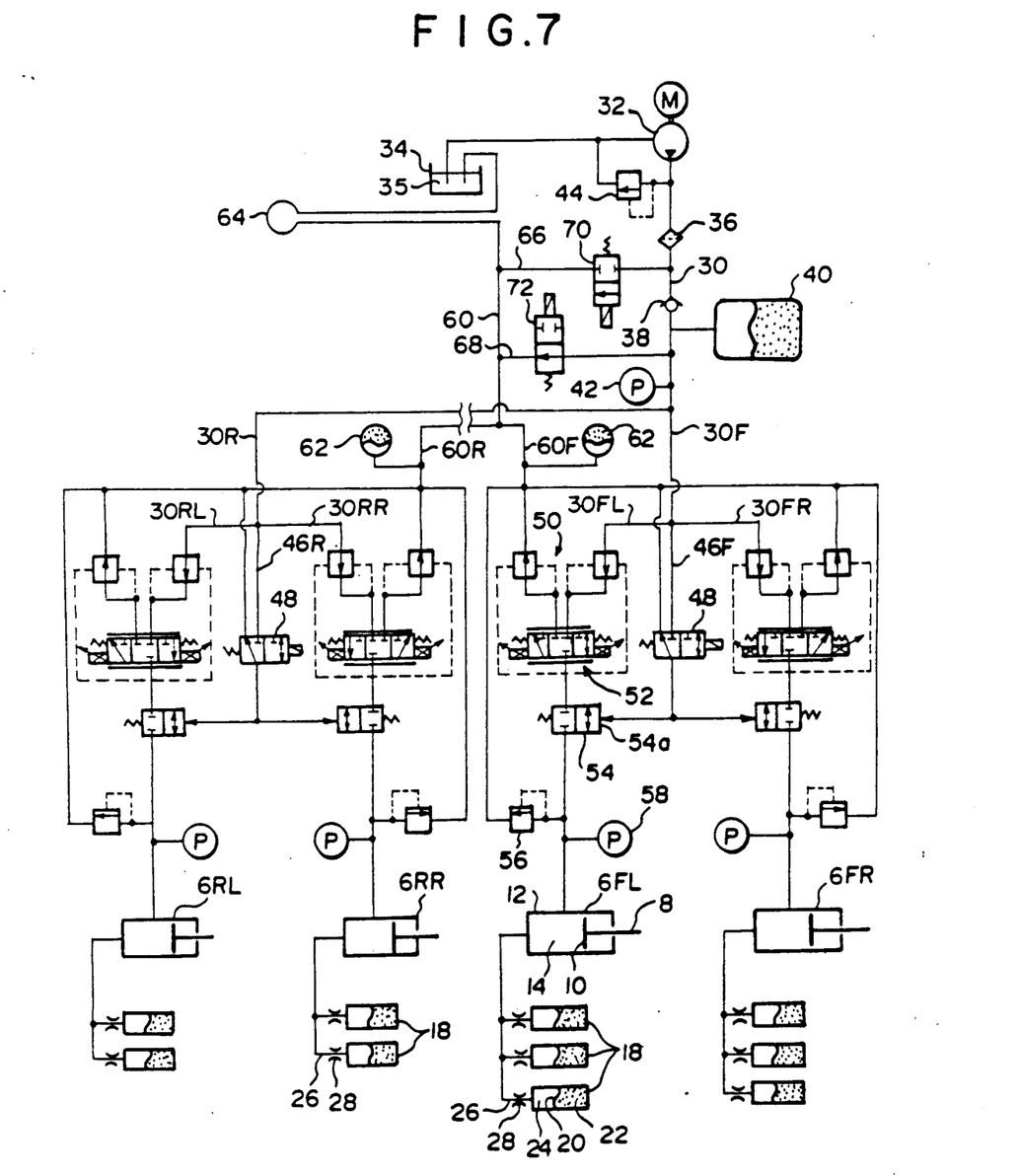
FIG. 7 is a view showing the hydraulic circuit for controlling the suspension system.

As shown in FIG. 7, three gas springs 18 are provided for each of the front wheels 4FR and 4FL, and two gas springs 18 are provided for each of the rear wheels 4RR and 4RL. The gas springs 18 for each wheel are communicated with the hydraulic chamber 14 in parallel to each other by way of a hydraulic passage 26. Each gas spring 18 is communicated with the hydraulic passage 26 by way of an orifice member 28 which has a throat portion. The combination of the hydraulic cylinder-piston device 6 and the gas spring 18 functions as an automotive suspension system by virtue of the shock absorption of the gas spring 18 and the damping effect of the orifice member 28.

The hydraulic fluid 35 is fed to the hydraulic cylinder-piston devices for the front wheels and discharged therefrom through a front high-pressure piping 30F, and the hydraulic fluid 35 is fed to the hydraulic cylinder-piston devices for the rear wheels and discharged therefrom through a rear high-pressure piping 30R. A hydraulic pump 32 discharges the hydraulic fluid 35 from a reservoir 34 into a common high-pressure piping 30 under a pressure and feeds the hydraulic fluid 35 to the front and rear high-pressure pipings 30F and 30R which are connected to the common high-pressure piping 30. The common high-pressure piping 30 is provided with a filter 36, a check valve 38, a main accumulator 40 and a system hydraulic gauge 42 in this order from the upstream side. The hydraulic pump 32 is provided with a relief valve 44 which returns the hydraulic fluid to the suction side when the pressure on the discharge side abnormally increases.

The front high-pressure piping 30F branches out into a left front wheel high-pressure piping 30FL and a right front wheel high-pressure piping 30FR which are respectively communicated with the hydraulic chambers 14 of the cylinder-piston devices 6 for the left front wheel 4FL and the right front wheel 4FR. (These cylinder-piston devices 6 will be referred to as "the left front wheel cylinder-piston device 6FL" and "the right front wheel cylinder-piston device 6FR", hereinbelow, and similarly, the cylinder-piston devices 6 for the left and right rear wheels will be referred to as "the left rear wheel cylinder-piston device 6RL" and "the right rear wheel cylinder-piston device 6RR", hereinbelow.) Similarly, the rear high-pressure piping 30R branches out into a left rear wheel high-pressure piping 30RL and a right rear wheel high-pressure piping 30RR which are respectively communicated with the hydraulic chambers 14 of the left rear wheel cylinder-piston device 6RL and the right rear wheel cylinder-piston device 6RR. Front and rear pilot passages 46F and 46R branch off respectively from the front and rear high-pressure pipings 30F and 30R. The pilot passages 46F and 46R are connected to solenoid valves 48. Each of the high-pressure pipings 30FR, 30FL, 30RR and 30RL is provided with a flow control valve 52 having a built-in pressure compensating valve 50, a pressure-actuated type on-off valve 54, a relief valve 56 and a hydraulic gauge 58 in this order from the upstream side. The relief port of each of the relief valves 56 is connected to a return piping 60F or 60R. Also the return ports of the pressure compensating valves 54 and the solenoid valves 48 are connected to the return piping 60F or 60R. Each of the return pipings 60F and 60R is provided with a return accumulator 62.

Both the front and rear return pipings 60F and 60R are connected to a common return piping 60 which leads to the reservoir 34 by way of a cooling line 64. The common return piping 60 is connected with the common high-pressure piping 30 by way of first and second relief pipings 66 and 68. The first relief piping 66 is provided with an unload relief valve 70, and the second relief piping 68 is provided with an ignition-interlocked valve 72 which is interlocked with the ignition switch of the engine. The first relief piping 66 is connected to the common high-pressure piping 30 at a portion upstream of the check valve 38, and second relief piping 68 is connected to the common high-pressure piping 30 at a portion downstream of the check valve 38.

The operation of the suspension system of this embodiment will be described, hereinbelow.

The unload relief valve 70, the ignition-interlocked valve 72, the solenoid valve 48 and the flow control valve 52 operate under the control of a control unit 74 (FIG. 6). Outputs of the system hydraulic gauge 42, the hydraulic gauges 58 for the respective cylinder-piston devices 6, acceleration sensors 76 which detect on-spring accelerations for the wheels 4FR, 4FL, 4RR and 4RL, and vehicle-level sensors 78 which detect the vehicle level (that is, the stroke of the pistons in cylinder-piston devices 6) for each wheel are input into the control unit 74. (Only the hydraulic gauge 58, the acceleration sensor 76 and the vehicle-level sensor 78 for the left rear wheel 4RL are shown in FIG. 6.) The control unit 74 controls feed and discharge of the hydraulic fluid 35 on the basis of the inner pressure of the cylinder 12, the on-spring acceleration and the vehicle-level detected by the hydraulic gauges 58, the acceleration sensors 76 and the vehicle level sensors 78.

While the solenoid valves 48 are kept closed by the control unit 74, the hydraulic fluid 35 in the pilot passages 46F and 46R cannot act on the pressure-actuated type on-off valves 54 even if the hydraulic pump 32 and the like are normally operating. The pressure-actuated type on-off valves 54 which are connected to the pilot passages 46F and 46R are normally kept closed, and are opened while a predetermined actuating pressure acts on an actuating pressure receiving port 54a thereof. Accordingly, while the solenoid valves 48 are kept closed, the pressure-actuated type on-off valves 54 are kept closed. While the pressure-actuated type on-off valves 54 are closed, the suspension system of this embodiment exhibits characteristics on the basis of the spring rate of the gas springs 18 and the resistance to flow of the orifice members 28 due to the throat portions thereof. That is, the suspension system functions as a so-called passive suspension in this state.

On the other hand, when the control unit 74 opens the solenoid valves 48, the pressure of the hydraulic fluid 35 acts on the actuating pressure receiving port 54a of the pressure-actuated type on-off valves 54 and the on-off valves 54 are opened so long as the hydraulic pump 32 and the like are operating normally. When the on-off valves 54 are opened and the hydraulic fluid 35 is introduced into the hydraulic chambers 14 of the cylinder-piston devices 6 while the flow control valves 52 has been opened to a degree determined by the control unit 74 and the pistons 10 has been displaced downward (leftward as seen in FIG. 7), displacement of the pistons 10 is restrained by the hydraulic fluid 35 introduced into the hydraulic chambers 14 and the dynamic spring rate of the suspension system is increased. Thus the feed and discharge of the hydraulic fluid 35 to and from the hydraulic chambers 14 of the cylinder-piston devices 6 result in the same effect which can be obtained when the spring rate of the gas springs 18 and the resistance to flow of the orifice members 28 are changed, and the suspension system of this embodiment functions as a so-called active suspension in this state. The vehicle-level can be adjusted for each wheel by control of the amount of hydraulic fluid 35 in the hydraulic chamber 14 of the cylinder-piston device 6 corresponding to the wheel.

When the pressure in the high-pressure piping 30 detected by the system hydraulic gauge 42 exceeds a preset value, the control unit 74 causes the unload relief valve 70 to open, whereby the hydraulic fluid 35 is returned to the reservoir 34 and the pressure in the high-pressure piping 30 is prevented from abnormally rising. Further the control unit 74 causes the ignition-interlocked valve 72 to close only when the ignition switch is on so that the ignition-interlocked valve 72 is opened when the engine is stopped and the pressure in the high-pressure piping 30 is lowered.

When the hydraulic pressure upstream of the flow control valve 52 is abnormally lowered due to, for instance, breakage of the high-pressure piping 30, the pressure-actuated type on-off valves 54 cannot be provided with a predetermined actuating pressure even if the solenoid valves 48 are open, and the valves 54 are closed. In this state, the suspension system is in the passive state described above. Even in the passive state, the suspension system maintains the basic functions of a suspension, and accordingly, this state gives rise to no problem on the running of the vehicle. When the vehicle is parked and the engine is stopped, the hydraulic pump 32 is stopped and the ignition-interlocked valve 72 is opened, and accordingly, the predetermined actuating pressure cannot act on the actuating pressure receiving ports 54a of the pressure-actuated type on-off valves 54. Accordingly, the pressure-actuated type on-off valves 54 are closed even if the solenoid valves 48 are out of order and kept open, and the situation that the hydraulic fluid 35 gradually flows out from the cylinder-piston devices 6 and the vehicle-level is reduced can be surely avoided.

The concrete structure of the part which supports the right front wheel 4FR will be described in detail with reference to FIGS. 1 to 5, hereinbelow. The parts which support the other wheels are substantially the same as that shown in FIGS. 1 to 5.

Figure 1:
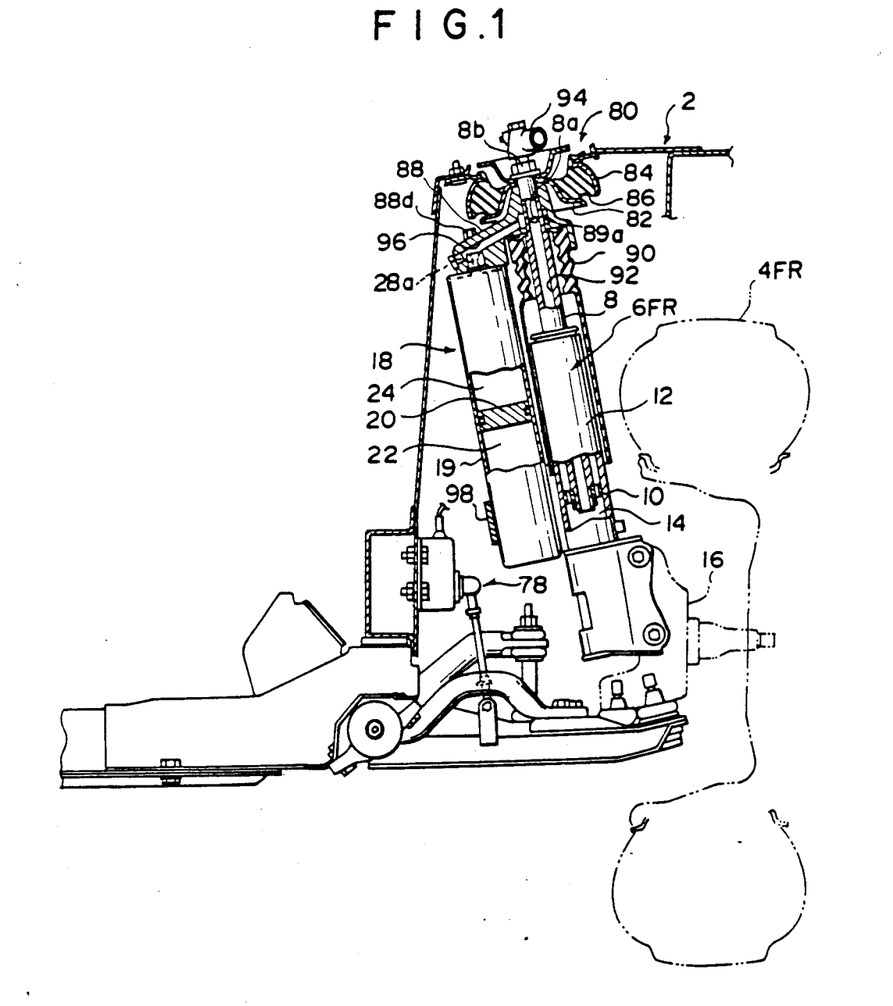
FIG. 1 is a rear view of a suspension system in accordance with an embodiment of the present invention.
Figure 2:
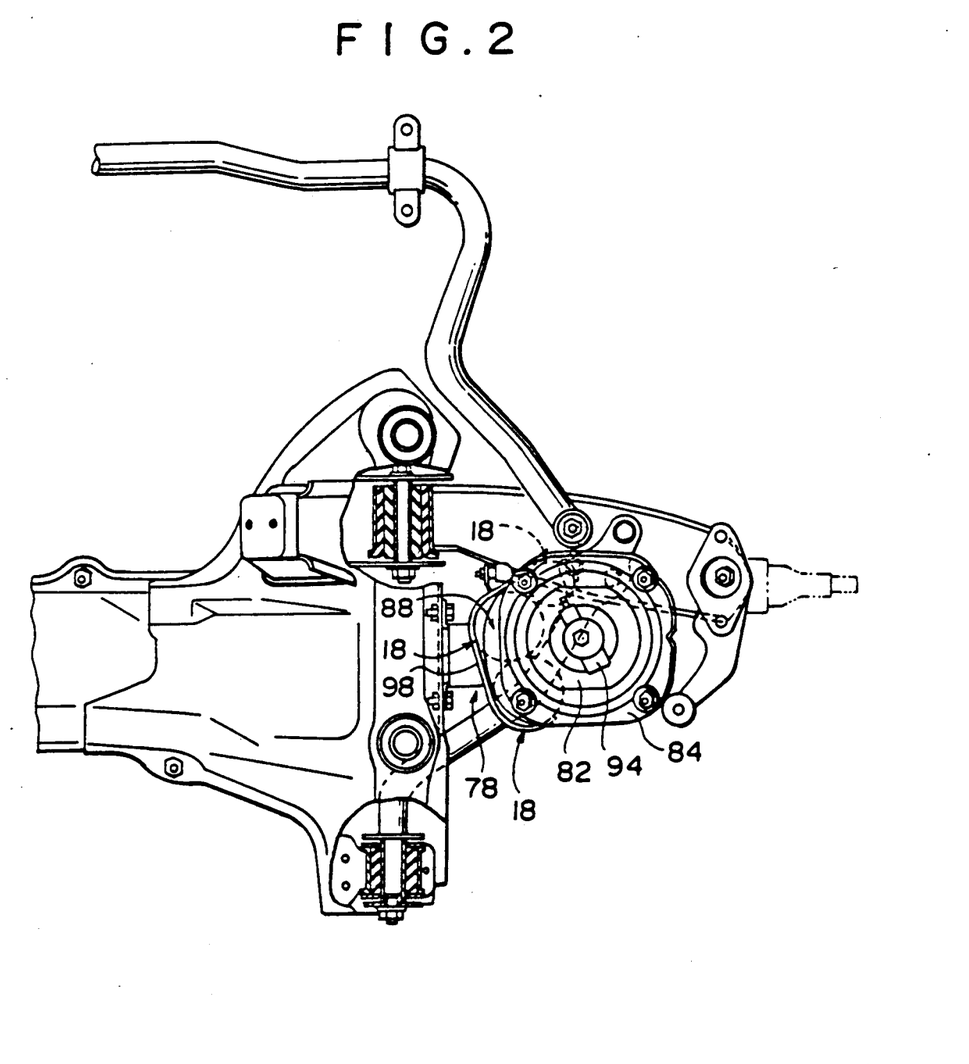
FIG. 2 is a plan view of the suspension system.

As shown in FIGS. 1 and 2, the piston rod 8 of the cylinder-piston device 6FR is resiliently connected to the vehicle body 2 by a strut mount rubber unit 80. The strut mount rubber unit 80 comprises an inner fitting 82, an outer fitting 84 and a mount rubber 86 secured to the fittings 82 and 84. The inner fitting 82 is fixed to the piston rod 8 at a portion near the upper end of the piston rod 8, and the outer fitting 84 is fixed to the vehicle body 2.

A support member 88 which supports the upper end portions of the three gas springs 18 (first to third gas springs 18a, 18b and 18c), a tubular member 90 which covers the upper end portion of the cylinder 12 are fixed to the piston rod 8 between the strut mount rubber unit 80 and the cylinder 12. A hydraulic passage 92 extends through the piston rod 8, and a joint 94 which connects a hydraulic fluid supply pipe (not shown) with the hydraulic passage 92 is fixed to the upper end of the piston rod 8. The upper end portion of the piston rod 8 is threaded and the piston rod 8 is connected to the strut mount rubber unit 80 by a nut 8b screwed on the threaded portion. As clearly shown in FIG. 3, first to third hydraulic passages 96a to 96c formed in the support member 88 communicate the hydraulic passage 92 in the piston rod 8 with the hydraulic chambers 14 of the respective gas springs 18a to 18c. That is, the hydraulic passage 26 shown in FIG. 7 is defined by the hydraulic passage 92 formed in the piston rod 8 and the hydraulic passages 96a to 96c formed in the support member 88. The orifice members 28 (first to third orifice members 28a, 28b and 28c) are fixed to the upper ends of the respective gas springs 18a to 18c and each orifice member is a tubular member having a throat portion 29 as clearly shown in FIG. 4.

Figure 3:
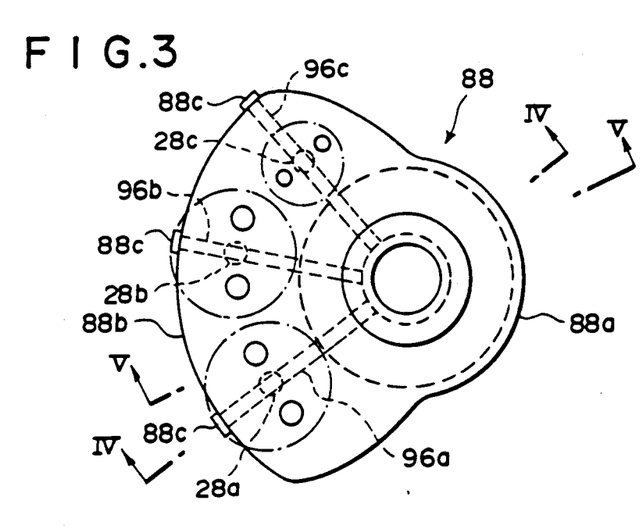
FIG. 3 is plan view showing the support member employed in the suspension system.
Figures 4, 5:
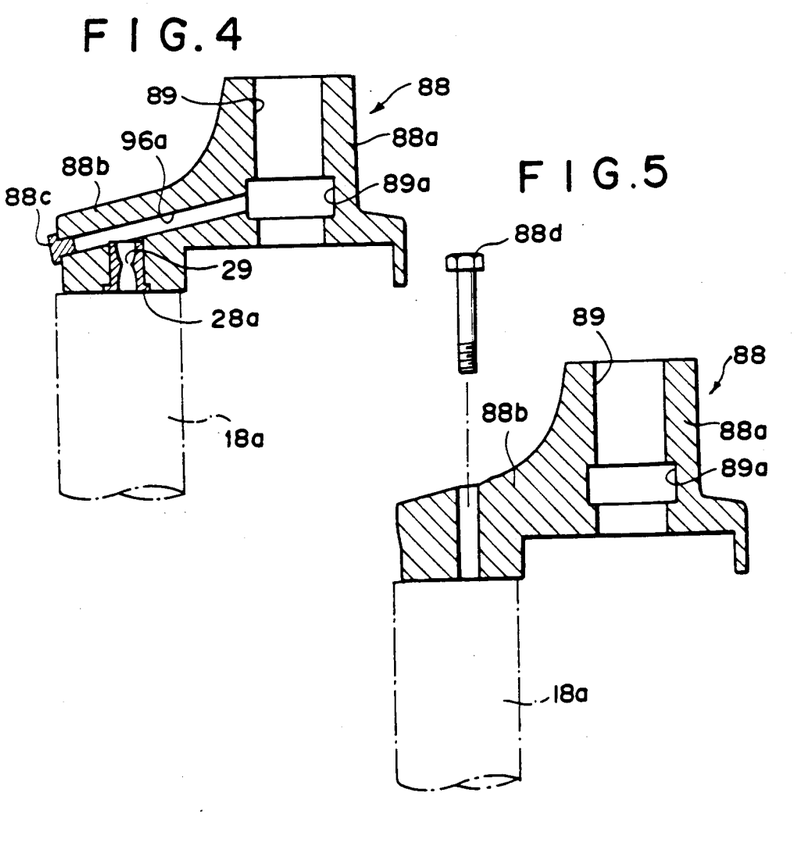
FIG. 4 is a cross-sectional view taken along line IV—IV in FIG. 3.
FIG. 5 is a cross-sectional view taken along line V—V in FIG. 3.

As clearly shown in FIGS. 3 to 5, the support member 88 comprises a tubular body portion 88a and a flange portion 88b formed integrally with the body portion 88a. The body portion 88a has a through hole 89 into which the piston rod 8 is fitted. An annular groove 89a is formed in the inner peripheral surface of the through hole 89, and the hydraulic passages 96a to 96c are through holes one ends of which open to the annular groove 89a and the other ends of which open in the outer side surface of the flange portion and are closed by plugs 88c. As best shown in FIG. 4, the orifice member 28 opens to an intermediate portion of the hydraulic passage 96. Further, the piston rod 8 is provided with a through hole 8a which radially extends through the piston rod 8 so that it communicates with the hydraulic passage 92 and opens in the annular groove 89a. That is, the hydraulic chambers 14 of the respective gas springs 18a to 18c are communicated with the hydraulic passage 92 in the piston rod 8 by way of the respective orifice members 28a to 28c, the respective hydraulic passage 96a to 96c, the annular groove 89a and the through hole 8a. Each gas spring 18 is fixed to the support member 88 by a pair of bolts 88d, which are screwed into a pair of threaded holes formed on the top wall of the gas spring 18 through holes in the flange portion 88b.

The casing 19 of each gas spring 18 is cylindrical in shape, and the movable partition wall 20 of the gas spring 18 is in the form of a piston. The first to third gas springs 18a to 18c are supported around the cylinder-piston device 6 in contact therewith and in parallel to therewith, and are connected with each other by a plate-like connecting bracket 98 which is welded to the casings 19 at lower end portions thereof.

In this embodiment, since a plurality of gas springs 18 are provided for each cylinder-piston device 6, the volume of the casing which is sufficient to accommodate the fluctuation in the volume of the gas chamber 22 which is caused by the pressure fluctuation in the hydraulic chamber 14 of the cylinder-piston device 6 due to bump or rebound of the wheel can be ensured even if the volume of the casing 19 of each gas spring 18 may be small. Further, since the casing 19 of each of the gas springs 18 is cylindrical and simple in shape, the gas spring 18 can be manufactured at low cost. Further, since the gas springs 18 are bundled around the cylinder-piston device 6, the gas springs 18 can be disposed in the space where the coil spring is disposed in the normal strut type suspension system. Further, in this embodiment, since the gas springs 18 are supported by the support member 88 at the upper end and are connected with each other at the lower end portion by the connecting bracket 98, the mounting rigidity of the gas springs 18 is increased and the resonance of the gas springs 18 can be prevented.

Figure 8:
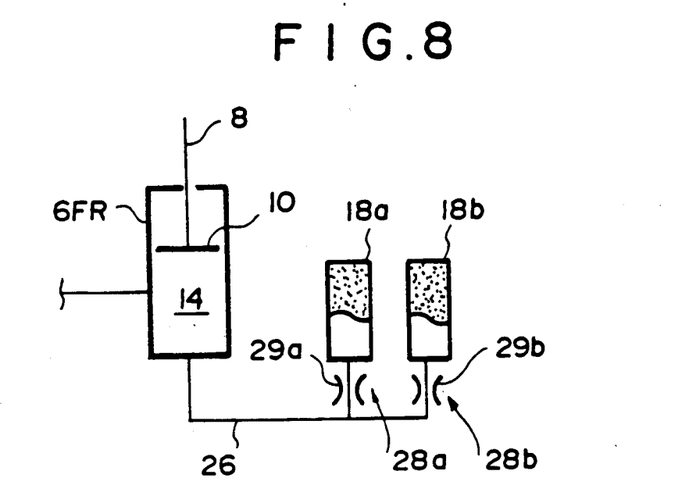
FIG. 8 is a schematic view for illustrating a modification of the suspension system.

FIG. 8 shows a modification of the embodiment described above. In this modification, all the cylinder-piston devices 6 are provided with a pair of gas springs 18 (first and second gas springs 18a and 18b), though only the cylinder-piston device 6FR for the right front wheel 4FR is shown in FIG. 8. The throat portion 29a of the orifice member 28a through which the first gas spring 18a is communicated with the hydraulic chamber 14 of the cylinder-piston device 6FR is narrower than the throat portion 29b of the orifice member 28b through which the second gas spring 18b is communicated with the hydraulic chamber 14 of the cylinder-piston device 6FR.

Figure 9:
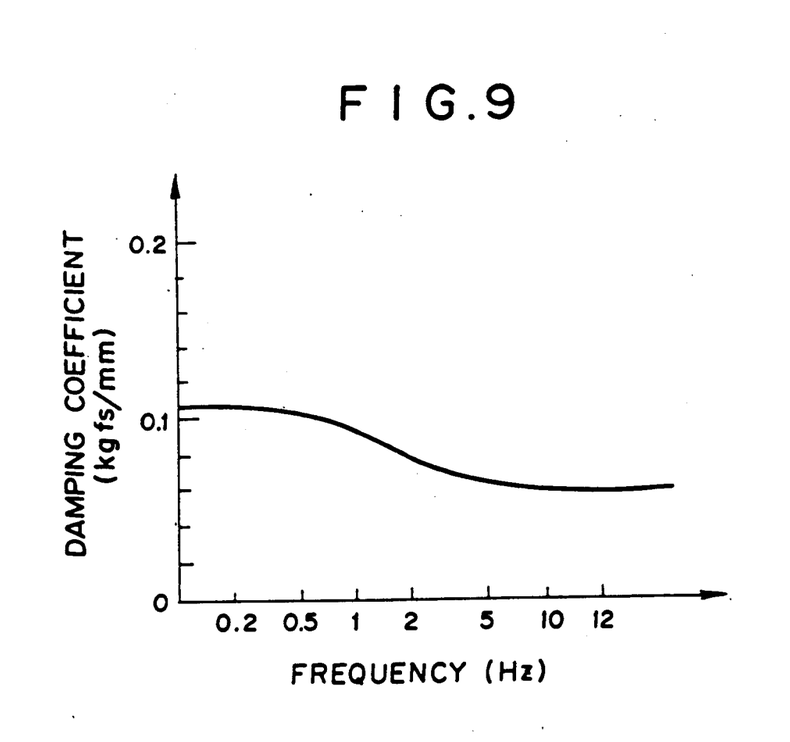
FIG. 9 is a graph showing an example of the relation between the frequency of the oscillation and the damping coefficient of the system.

When the piston 10 oscillates in the hydraulic chamber 14 at a relatively high frequency, e.g., 10 Hz, the hydraulic fluid 35 flows through the hydraulic passage 26 at a relatively high speed and accordingly, the resistance to flow is increased at the throat portion 29a of the orifice member 28a which is relatively narrow, whereby the damping effect of the orifice member 28a is lowered and substantially the other orifice member 28b only exerts the damping effect. On the other hand, when the piston 10 oscillates at a relatively low frequency, e.g., 1 Hz, the hydraulic fluid 35 flows through the hydraulic passage 26 at a relatively low speed and accordingly, the hydraulic fluid 35 smoothly flows through both the orifices 28a and 28b so that both the orifices 28a and 28b exert the damping effect. In the latter case, the damping coefficient of the overall system is enlarged as compared with the former case since the first orifice having the throat portion 29a which is narrow and has a large damping coefficient acts as a damper. When the piston 10 oscillates at an intermediate frequency between the above two frequencies, the damping coefficient of the overall system changes with the frequency as shown in FIG. 9.

The suspension system in accordance with this modification exerts a high damping effect against an oscillation of a low frequency and exerts a low damping effect against an oscillation of a high frequency. Since the resonance frequency of the roll, pitch and bounce of the vehicle is about 1 Hz, the suspension system is required to exert a high damping effect against the vibration of about 1 Hz. On the other hand, the suspension system is required to exert a low damping effect against the vibration of a high frequency higher than about 3 to 4 Hz due to the impact against the road surface. For this purpose, the suspension system in accordance with the above modification is preferable.

We claim:

1. A hydropneumatic suspension system for a vehicle comprising a hydraulic cylinder-piston device which is connected between the vehicle body and each of the wheels and includes a cylinder which defines a hydraulic chamber together with a piston slidably received therein, a piston rod being connected to the piston and projecting upward from the cylinder, and a plurality of gas springs each of which has a fluid chamber and a gas chamber which are defined in a cylindrical casing and are separated from each other by a movable partition wall, the fluid chamber being communicated with the hydraulic chamber of the hydraulic cylinder-piston device so that each gas spring exerts a spring force according to the hydraulic pressure in the hydraulic chamber of the cylinder-piston device characterized in that the upper end portion of the piston rod is supported by the vehicle body by way of a mount, the piston rod is provided with a fluid passage which axially extends through the piston rod and the lower end of which opens to the hydraulic chamber of the cylinder-piston device, a support member is fixed to the piston rod at an upper portion below the mount, and the upper end portions of the casings of the gas springs are mounted on the support member, the fluid chamber of each gas spring being communicated with the fluid passage in the piston rod by way of a fluid passage formed in the support member.

2. A hydropneumatic suspension system as defined in claim 1 in which said support member comprises a substantially tubular member having a through hole, and the upper end portion of said piston rod is inserted into the through hole and is fixed there.

3. A hydropneumatic suspension system as defined in claim 2 in which an annular groove is provided on the inner peripheral surface of the through hole of said support member, the piston rod is provided with a hole which radially extends through the piston rod and communicates with said fluid passage in the piston rod, and the support member is fixed to the piston rod so that the fluid passage in the piston rod communicates with the annular groove by way of the hole.

4. A hydropneumatic suspension system as defined in claim 3 in which said support member is provided with a plurality of fluid passages each of which opens to the annular groove at one end and to the lower surface of the support member at the other end, the upper end portions of the casings of the gas springs being in contact with the lower surface of the support member.

5. A hydropneumatic suspension system as defined in claim 4 in which the fluid chamber in each of the gas springs are communicated with one of the fluid passages in the support member by way of an orifice member having a throat portion.

6. A hydropneumatic suspension system as defined in claim 5 in which the cross-sectional area of the throat portion of each orifice member differs from that of the other orifice members.

7. A hydropneumatic suspension system as defined in claim 2 said support member has a flange portion extending toward the inside of the vehicle body from said tubular position, and said gas springs are mounted on the lower side of the flange portion.

8. A hydropneumatic suspension system as defined in claim 2 in which said mount comprises a body side annular flange member connected to the vehicle body, a piston rod side annular flange member connected to the piston rod, and an annular resilient member connected between the flange members, and the support member is sandwiched between the lower part of the cylinder-piston device and the piston rod side annular flange member and is held there by a unit which is screwed on a threaded portion of the piston rod.

9. A hydropneumatic suspension system as defined in claim 2 in which the casings of the gas springs are connected together at their lower portions by a bracket member.

10. A hydropneumatic suspension system as defined in claim 1 in which the lower end of the cylinder of the cylinder-piston device is connected to a member which supports the wheel for rotation.

11. A hydropneumatic suspension system as defined in claim 1 in which a joint member for connecting the fluid passage in the piston rod to the hydraulic fluid supply line and the hydraulic fluid drain line in mounted on the upper end of the piston rod.

12. A hydropneumatic suspension system as defined in claim 1 in which said gas springs are disposed around the cylinder-piston device in the vicinity thereof.

* * * * *